United States Patent [19]
Jones et al.

[11] 3,937,539
[45] Feb. 10, 1976

[54] BEARING ASSEMBLY HAVING PRESS-FITTED THRUST RIBS

[75] Inventors: James Eddie Jones, Canton; William E. Harbottle, North Canton; Dennis Lee Otto, Malvern, all of Ohio

[73] Assignee: The Timken Company, Canton, Ohio

[22] Filed: Dec. 19, 1973

[21] Appl. No.: 425,982

[52] U.S. Cl. .............................................. 308/214
[51] Int. Cl.² ........................................ F16C 19/38
[58] Field of Search ............ 308/214, 218, 216, 202

[56] References Cited
UNITED STATES PATENTS

| | | | |
|---|---|---|---|
| 1,911,336 | 5/1933 | Ackerman | 308/214 |
| 2,195,795 | 4/1940 | Baker | 308/214 |
| 3,311,432 | 3/1967 | Cowles | 308/216 |

FOREIGN PATENTS OR APPLICATIONS

| | | | |
|---|---|---|---|
| 2,138,434 | 2/1973 | Germany | 308/214 |

*Primary Examiner*—M. Henson Wood, Jr.
*Assistant Examiner*—Richard A. Bertsch
*Attorney, Agent, or Firm*—Gravely, Lieder & Woodruff

[57] ABSTRACT

A bearing assembly has a shaft extended through a double cup with opposed tapered raceways machined directly into the cup and shaft. A row of tapered rollers is positioned between each pair of raceways, and the rollers of each row are mounted in opposition and substantially on apex. Expulsion of the rollers is prevented by annular rib rings which are press-fitted over the shaft and embrace the shaft at the large diameter ends of the tapered raceways thereon. The shaft has grooves which underlie the rib rings and enhance the holding power of the rings.

15 Claims, 3 Drawing Figures

3,937,539

BEARING ASSEMBLY HAVING PRESS-FITTED THRUST RIBS

BACKGROUND OF THE INVENTION

This invention relates in general to bearings and more particularly to a bearing assembly for a shaft in a housing.

The typical tapered roller bearing arrangement used between a shaft and a surrounding housing includes two bearings, each with a cup or outer race, a cone or inner race, and tapered rollers between the cup and cone. The bearings are positioned such that the tapers of their raceways and rollers project in opposite directions so that one bearing can be adjusted against the other by moving either the cup or cone of the one bearing in the axial direction. The adjustment is usually effected by turning an adjusting nut against the back face of one of the cones.

Bearing arrangements of the foregoing nature require many machining operations on the shaft as well as on the cone and consequently are expensive. Moreover, adjustment is a relatively time consuming procedure.

SUMMARY OF THE INVENTION

One of the principal objects of the present invention is to provide a bearing assembly for mounting a shaft in a housing with a minimum amount of bearing components. Another object is to provide a bearing assembly having a minimum amount of machined surfaces. A further object is to provide a bearing assembly which is easily and quickly assembled and adjusted. An additional object is to provide a bearing assembly which is extremely reliable and durable. Still another object is to provide a tapered roller bearing assembly in which the tapered rollers are retained in the axial direction by press-fitted thrust rib rings, and wherein the bearing assembly is adjusted by moving the rib rings axially. Yet another object is to provide a bearing assembly which is an integrally sealed and lubricated package. These and other objects and advantages will become apparent hereinafter.

The present invention is embodied in a bearing assembly having an outer race, a shaft extended through the outer race, and rolling elements between the shaft and outer race. The rolling elements are confined in the axial direction by a rib ring press-fitted over the shaft. The invention also consists in the parts and in the arrangements and combinations of parts hereinafter described and claimed.

DESCRIPTION OF THE DRAWINGS

In the accompanying drawings which form part of the specification and wherein like numerals and letters refer to like parts wherever they occur.

DETAILED DESCRIPTION

Figure 1:
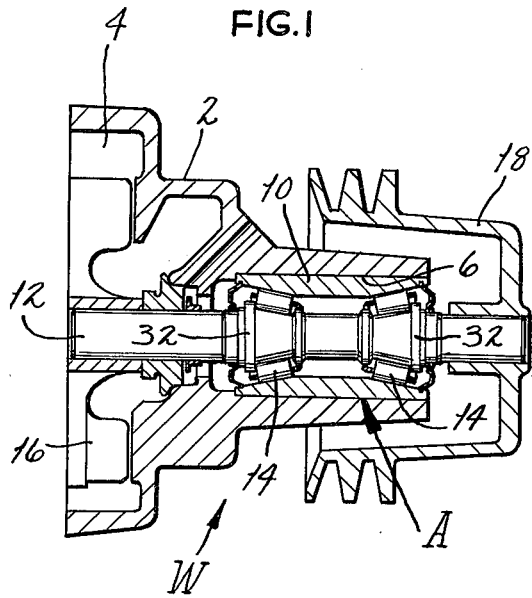
FIG. 1 is a sectional view of a water pump provided with the bearing assembly of the present invention.

Referring now to the drawings, A represents a bearing assembly used in a typical application which in this case is a water pump W (FIG. 1) including a housing 2 having an impeller cavity 4 at one end and a bore 6 at its other end. The bore 6 contains the bearing assembly A which broadly speaking includes a double cup 10, a shaft 12 extended through the double cup 10, and tapered rollers 14 between the cup 10 and the shaft 12 to enable the shaft 12 to rotate easily in the housing 2. One end of the shaft 12 carries an impeller 16 which rotates in the impeller cavity 4 of the housing 2, while the other end is fitted with a V-belt pulley 18 to transmit the power required to operate the water pump.

Figure 2:
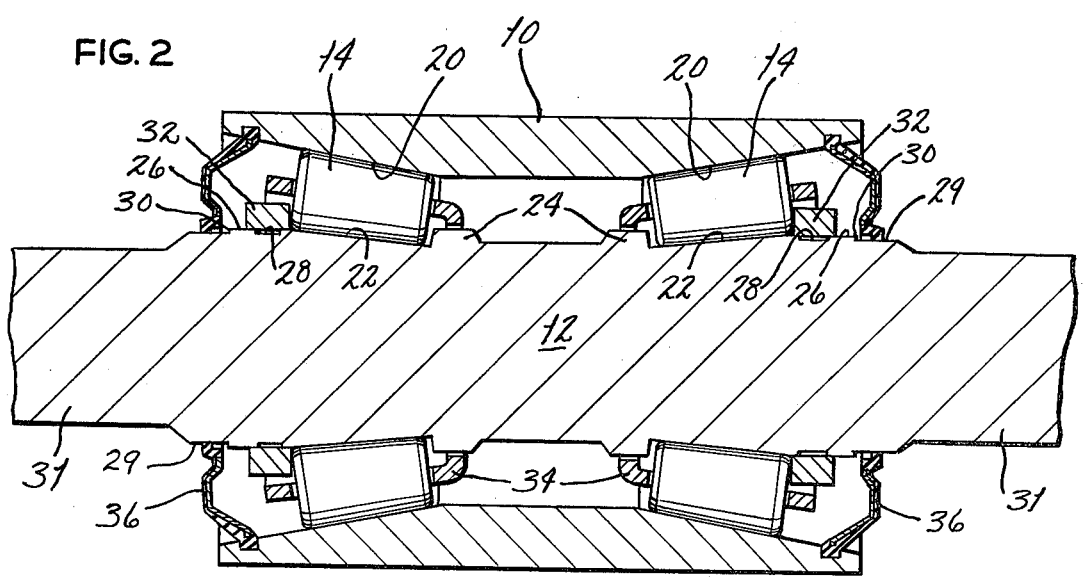
FIG. 2 is an enlarged sectional view of the bearing assembly in FIG. 1.

Turning now to the bearing assembly A (FIG. 2), as previously noted it includes the double cup 10, the shaft 12, and the tapered rollers 14 between the cup 10 and shaft 12. The outer surface of the cup 10 is cylindrical and is slightly larger in diameter than the bore 6 of the housing 2 so that an interference fit exists between the two. The cup 10 is pressed into the bore 6 and is retained in place by the friction of the interference fit. On its inside surface, the cup 10 is provided with a pair of tapered raceways 20 which are oriented such that their large diameter ends are at the opposite outer ends of the cup 10.

The shaft 12 extends through the cup 10 and has tapered raceways 22 located opposite to the raceways 30 on the cup 10. The raceways 22 are machined directly into the shaft 12, which is hardened in the vicinity of them. The tapered rollers 14 are arranged in two rows located between the raceways 20 and 22. Moreover, the rollers 14 are substantially on apex, that is for all intents and purposes for each row, the cone defined by raceway 20 and the cone defined by the raceway 22 have their apexes located at one point along the axial centerline of the shaft 12 and the cones defined by the individual rollers of each row have their apexes at that same point. As a result, pure rolling contact exists between the rollers 14 and the raceways 20 and 22 of the cup 10 and shaft 12, respectively.

At the small diameter ends of the shaft raceways 22, the shaft 12 is provided with roller retention ribs 24 which are positioned adjacent the small diameter ends of the rollers 14. At the large diameter ends of the shaft raceway 22, the shaft 12 has ground cylindrical surfaces 26, the diameters of which are maintained within close tolerances.

Each cylindrical surface 26 is interrupted by a circumferential groove 28 which opens outwardly therefrom and is positioned such that a portion of the surface 26 is on each side of it. The intersection of each cylindrical surface 26 and the groove sidewall located closest to the raceway 22 is somewhat chamfered, while the intersection of each cylindrical surface 26 and the groove sidewall located furthest from the raceway 22 is retained as sharp as possible. The grooves 28 should be between 0.003 and 0.010 inches deep and preferably 0.005 inches deep. These grooves should also be between 0.030 and 0.050 inches wide in the axial direction. These dimensions pertain only to shaft diameters less than 1.000 inch.

The cylindrical surfaces 26 merge into cylindrical sealing surfaces 29 at broken or beveled corners 30, and the sealing surfaces 29 are slightly smaller in diameter than the surfaces 26. The sealing surfaces 29 in turn merge into reduced end portions 31 which are still smaller in diameter. The impeller 16 is mounted on one reduced end portion 31 and the pulley 18 is on the other.

To prevent the rollers 14 from being expelled from the annular space between the cup 10 and the shaft 12, thrust rib rings 32 are press-fitted over the cylindrical surfaces 26, and the axial positions of these rings 32 determines the adjustment of the entire bearing assembly A. For example, the rings 32 may be positioned such that the bearing assembly A is provided with "clearance", in which case the shaft 12 may be moved both radially and axially with respect to double cup 10. By moving the rib rings 32 closer together, eventually a condition of "preload" is reached, in which case the rollers 14 are in effect compressed between the raceways 20 and 22 and no radial or axial play exists in the bearing A. Normally, the bearing assembly A will be operated with slight clearance.

Irrespective of whether the bearing assembly A is operated with clearance or preload, the thrust rib rings 32 span the grooves 28, that is each ring 32 embraces the cylindrical surface 26 on which it is positioned on each side of the groove 28 in that surface. The inside surfaces of each rib ring 32 is cylindrical and its diameter is slightly less than the diameter of the cylindrical surface 26 which it embraces so that an interference fit exists between the two. This interference fit should be between 0.006 and 0.008 inches for shaft diameters less than 1.000 inch. In pressing the rib rings 32 over the cylindrical surface 26 the direction of advance should be from the broken corners 30 toward the raceways 22 so that the sharp edge of the groove 28 is covered first and then the chamfered edge. Thus, the sharp edge of the groove 28 is positioned to retain the rib ring 32 and prevent it from working off of the shaft 12 under the expulsion forces applied to the rollers 14. The rib rings 32 should be formed from high quality hardened steel. The inside diameter of the rib rings 32 is greater than the diameter of the sealing surfaces 29 so those surfaces are not scratched by the rings 32 when the rings 32 move over them.

Correct spacing is maintained between adjacent rollers 14 of each row by a cage 34. Grease or some other lubricant is retained within the annular space between the cup 10 and shaft 12 by seals 36 which are fitted into inwardly opening grooves in the cup 10. The seals 36 have elastomeric seal elements which embrace the cylindrical sealing surfaces 29 of the shaft 12 outwardly from the rib rings 32. The cylindrical surfaces 29 embraced by the seals 36 are of a slightly smaller diameter than the cylindrical surfaces 26 embraced by the rib rings 32 to insure smooth sealing surfaces unscratched by the interference fit of the rib rings 32.

The assembly of the bearing assembly A is normally undertaken before the bearing assembly is installed in the housing 2, although this is not absolutely necessary. To assemble the bearing assembly A, one of the thrust rib rings 32 is passed over the reduced portion 31 and sealing surface 29 at that end of the shaft 12 which is expected to carry the heaviest loading, that is the reduced portion 31 on which the pulley 18 is mounted. The thrust rib ring 32 is then positioned against the somewhat beveled corner 30 at the intersection of surfaces 29 and 26 and is thereafter pressed over the cylindrical surface 26 to its final position wherein it bridges the circumferential groove 28 in the surface 26. The final position of the first installed thrust rib 32 is where it locates the tapered rollers 14 which bear against it such that those rollers 14 run precisely on apex, that is the cones defined by rollers 14 of the row have their apexes at the same point along the axial centerline of the shaft 12. Hence, true rolling contact will exist between the rollers 14 and the raceways 20 and 22 at that end of the bearing assembly A which carries the heaviest loading, that is the end on which the pulley 18 is mounted.

After the first rib ring 32 is pressed onto the shaft 12, a set or row of rollers 14 is positioned against that ring 32 and the shaft raceway 22 adjacent to it. The cage 34 for the roller set is installed prior to or at this time. With the first set of rollers 14 and its cage 34 in place against the shaft 12, the shaft 12 is inserted through the double cup 10 until the rollers 14 come against one of the raceways 20 of the cup 10.

Once the first set or row of rollers 14 is in place between its respective raceways 20 and 22 on the cup 10 and shaft 12, the second set or row of rollers 14 along with its cage 34 is positioned between the raceways 20 and 22 at the other end of the bearing assembly A, whereupon the second rib ring 32 is pressed onto the other cylindrical surface 26 and advanced toward the large diameter ends of the rollers 14 in the second set. The second rib ring 32 may or may not be moved to its final position at this time. Of course, the position of the second rib ring 32 determines the adjustment of the bearing, and if the rib ring 32 is moved to its final position, contraction of the double cup 10 during installation in the housing bore 6 must be taken into account at this time. In other words, the bearing assembly A must be initially adjusted with a slight amount of end play in excess of that desired in the final bearing setting so as to compensate for the reduction of end play occasioned by the subsequent contraction of the cup 10 due to the interference fit between the double cup 10 and the bore 6 of the housing 2. On the other hand, the second rib ring 32 may be moved over cylindrical surface 26 enough to hold the bearing assembly A together, while being sufficiently away from its final position to require further advance for adjustment purposes. With the bearing assembly A in this condition, the double cup 10 is pressed into the bore 6 of the housing 2, and this of course causes the cup 10 to contract. Thereafter, the bearing assembly A is adjusted by moving the second thrust rib ring 32 to its final position.

Figure 3:
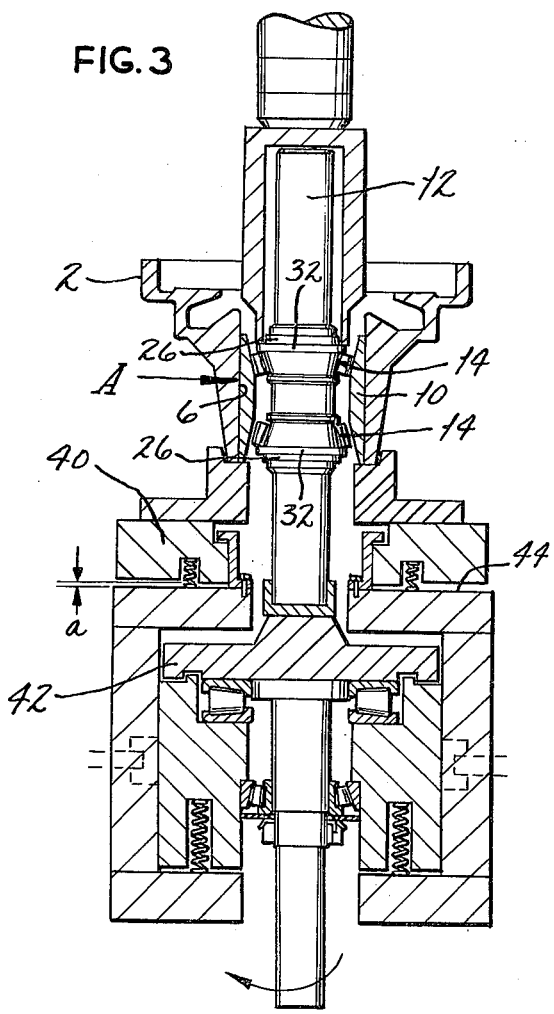
FIG. 3 is a sectional view of an apparatus used to adjust the bearing assembly.

Irrespective of whether the bearing assembly A is adjusted before or after the double cup 10 is installed in the bore 6 of the housing 2, the adjustment may be carried out in accordance with the adjustment procedures set forth in U.S. patent application Ser. No. 237,462, filed Mar. 23, 1972, of William E. Harbottle, entitled Method for Adjusting Tapered Roller Bearings and For Assembling Devices Employing Such Bearings as Journals. In particular, the adjustment is made be first positioning those ends of the cup 10 and shaft 12 located closest to the first installed rib ring 32 against separate supporting members 40 and 42, respectively (FIG. 3), both of which are spring loaded and urged upwardly. The relative positions of the supporting members 40 and 42 are such that a clearance exists between the first installed set of rollers 14 and its raceways 20 and 22. The supporting member 42 against which the shaft 12 is positioned rotates slowly so that the rollers 14 roll along their raceways 20 and 22 while the adjustment is carried out. Once the cup 10 and shaft 12 are so supported, a downwardly directed axial force is applied to the cup 10 at its opposite end and this force moves the cup 10 downwardly against the spring load on its supporting member 40. After a short distance the rollers 14 of the first installed row seat against their raceways 20 and 22 so that the downwardly directed force is transmitted through the rollers 14 of the first set to the shaft 12, causing the shaft 12 to move downwardly against its spring load. In time, the support member 40 for the cup 10 bottoms out against a fixed reference surface 44 and with the force still applied the support member 42 is locked or otherwise held in a fixed axial position with respect to the reference surface 44. Thereafter, the force is released and the spring load on support member 40 for the cup 10 moves back to its initial position, carrying the cup 10 with it. This creates a known clearance between the rollers 14 of the first or lower bearing and the raceways 20 and 22 for that bearing, the axial component of that clearance being equal to the distance between the cup supporting member 40 and the reference surface 44.

Once the known clearance is established, the second thrust rib 32 is pressed further over its cylindrical surface 26 toward the raceway 22 adjacent to that surface, while the shaft 12 is retained in the fixed axial position by its supporting member 42. In time, the advancing rib ring 32 engages the rollers 14 of the second or upper set which are seated against their raceways 20 and 22. When this occurs, the continued advancement of the second rib ring 32 causes the cup 10 and the supporting member 40 for it to move downwardly against the spring load on the supporting member 40. As a result, the clearance a between the supporting member 40 for the cup 10 and the reference surface 44 decreases. This clearance a equals the axial component of the clearance between the rollers 14 of the first set and its raceways 20 and 22. When the clearance a reaches the prescribed value for the bearing assembly A, the force on the second rib ring 32 is released. At this point, the rollers 14 of the second set may not be precisely on apex, but they will be close enough to be within tolerances acceptable for tapered roller bearings. Since the first rib ring 32 is precisely positioned at the end where the heaviest loading is taken, the effects of off apex operation at the opposite lightly loaded end will be minimized.

After the bearing assembly is adjusted and pressed into the bore 6 of the housing 2, the seals 36 are installed in the ends of the cup 10, and the impeller 16 and pulley 18 are installed on the reduced end portions 31 of shaft 12.

After the bearing assembly A has operated for 24 hours or more it has been found that it takes considerably more force to remove the thrust ribs 32 from their cylindrical surfaces 26 than would have been necessary to remove them immediately after installation or any time prior to operation. Indeed, the removal force is about 40 to 50 percent greater after about 24 hours of operation. It is believed that the dynamic forces generated by the rollers 14 as they bear against the thrust rib rings 32 and cyclic shaft deflection tend to work or deform the thrust rib rings 32 into the circumferential grooves 28. The deformation is believed to be both elastic and plastic. Thrust rib rings 32 which have been pressed off of their shafts 12 after operation exhibit discernible ridges in the areas which were formerly opposite the grooves 28. Moreover, metal particles remained in the grooves 28, indicating shearing of the thrust ribs 32 during removal. The inside surfaces of the rib rings 32 when removed from an uninterrupted cylindrical surface have a mirror finish indicating microscopic working of the rib ring 32 against the cylindrical shaft surface 26.

This evidence of working on cylindrical surfaces 26 and 32 which yields microscopic wear helps account for the embedding phenomina experienced when the grooves 28 are present because this wear allows relaxation of the unworn metal directly opposite the groove 28 into the groove 28. A bearing assembly with no grooves 28 in its cylindrical surfaces 26 requires less force to remove the rib rings 32 after operation than would have been required prior to operation if the bearing has been operated at least 24 hours. For bearing assemblies of equivalent size, it takes somewhat more force to remove the rib ring 32 from a surface without the groove 28 than with the groove 28 prior to operation, but the force necessary to remove the rib rings 32 after initial operation is substantially greater with groove 28 than without it.

Thus, the presence of the grooves 28 beneath the thrust ribs 32 significantly increase the holding power of the thrust ribs 32 so the chances of the ribs 32 walking off the shaft 12 in operation are greatly reduced.

This invention is intended to cover all changes and modifications of the example of the invention herein chosen for purposes of the disclosure which do not constitute departures from the spirit and scope of the invention.

What is claimed is:

1. A bearing assembly comprising a cup having a tapered raceway; a shaft extended through the cup and having a tapered raceway located opposite to the cup raceway, the shaft also having a substantially cylindrical surface located adjacent to the large diameter end of the tapered raceway, the diameter of the cylindrical surface and the diameter of the large end of the tapered raceway being substantially equal; tapered rollers fitted between and contacting the raceways; and an annular thrust rib ring press-fitted over the cylindrical surface of the shaft and positioned opposite the large diameter ends of the rollers to maintain the rollers in the correct axial position with respect to the shaft.

2. A tapered roller bearing according to claim 1 wherein the shaft has a circumferential groove which opens out of the cylindrical surface and is covered by the rib ring with the rib ring being spaced from the base of the groove.

3. A tapered roller bearing according to claim 2 wherein the rib ring spans the groove and contacts and embraces the cylindrical surface of the shaft on each side of the groove.

4. A tapered roller bearing according to claim 3 wherein the groove is at least 0.003 inches in depth.

5. A tapered roller bearing according to claim 2 wherein the raceway is machined directly into and forms an integral part of the shaft.

6. A bearing assembly according to claim 1 wherein the raceways and the rollers are configured and positioned such that the rollers are substantially on apex.

7. A bearing assembly comprising: an outer race having an inwardly presented raceway; a shaft extending through the outer race and having an outwardly presented raceway located thereon opposite to the raceway of the outer race, the shaft having an outwardly opening depression located axially beyond the raceway on the shaft; rolling elements located between and contacting the raceways; and a rib ring encircling the shaft at the depression therein, the rib ring extending over the depression while being spaced from the base of the depression; the rib ring being located against the rolling elements to axially position the rolling elements between the raceways, the rib ring further being sized for a tight interference fit with the shaft.

8. A bearing assembly according to claim 7 wherein the raceways and the rolling elements are configured and positioned such that they are capable of accommodating both thrust and radial loadings; and wherein the rib ring is positioned to prevent the rolling elements from being expelled under loading.

9. A bearing assembly according to claim 8 wherein the depression is a circumferential groove in the shaft; wherein the shaft is cylindrical on each side of the groove; and wherein the inner surface of the thrust rib is also cylindrical and embraces the cylindrical surface of the shaft on both sides of the groove.

10. A bearing assembly according to claim 7 wherein the shaft has a cylindrical surface which leads up to the depression so that the depression opens out of the cylindrical surface, the cylindrical surface being located on the opposite side of the depression from the raceway on the shaft; and wherein the shaft embraces the cylindrical surface.

11. A bearing assembly according to claim 10 wherein the depression opens out of the cylindrical surface along a sharp edge and the rib ring extends over and covers the sharp edge.

12. A bearing assembly according to claim 11 wherein the depression is an annular groove at least 0.003 inches in depth.

13. A bearing assembly according to claim 11 wherein the raceways and the rollers are tapered and configured such that the rollers are substantially on apex; and wherein the rib ring is positioned opposite to and contacts the large diameter ends of the rollers to prevent the rollers from being expelled from the space between the raceways.

14. A bearing assembly comprising a cup having two tapered raceways on it; a shaft extended through the cup and having two tapered raceways located opposite to the raceways of the cup whereby two sets of opposed tapered raceways exist in the bearing assembly; tapered rollers arranged in two rows, with the rollers of one row being between and contacting the raceways of the one set and the rollers of the other row being between and contacting the raceways of the other set, the tapered rollers of the one row being directed in the opposite direction from the tapered rollers of the other row; and annular thrust rib rings pressfitted over the shaft and positioned opposite the large diameter ends of the rollers in each row to maintain the rollers in the correct axial position with respect to the shaft, whereby the adjustment of the bearing assembly is dependent on the axial positioning of the thrust rib rings.

15. A bearing assembly according to claim 4 wherein the shaft has annular grooves around which the thrust ribs extend.

* * * * *